Patented Apr. 21, 1936

2,037,790

UNITED STATES PATENT OFFICE 2,037,790

TREATMENT OF HYDROCARBON OILS

Vladimir Ipatieff, Chicago, Ill., assignor to Universal Oil Products Company, Chicago, Ill., a corporation of Delaware No Drawing. Application January 16, 1933, Serial No. 652,010

4 Claims. (Cl. 196—24)

This invention relates more particularly to the treatment of the lower boiling gasoline hydrocarbons produced from cracking heavy petroleum oils, though natural or uncracked gasolines produced in the primary distillation of crude petroleum or other low boiling hydrocarbon oil mixtures may also be treated.

In a more specific sense the invention has reference to a process for treating such motor fuel mixtures to reduce their sulphur content and produce other desirable refining effects.

Low boiling cracked distillates, particularly those produced by cracking high sulphur charging oils under intensive conditions, contain two classes of undesirable constituents in minor proportions. The first class comprises hydrocarbons of the character of di- and tri-olefins, which have pronounced gum-forming tendencies and also cause the development of color during storage. The second class comprises, in addition to minor amounts of hydrogen sulphide, such hydrocarbon sulphur derivatives as mercaptans, thio-ethers, thiophenes, thiophanes, etc., this class being generally objectionable on account of their bad odor and also generally on account of their corrosive tendencies either per se, or on account of the oxides of sulphur produced by their combustion in the cylinders of internal combustion engines.

The relative proportions of these two undesirable classes vary considerably but in general it may be stated that both classes are always present in cracked gasolines. While a number of processes aimed at the controllable reduction by polymerization of the gum-forming materials have been successful, I am not aware of any present commercial process which is effective in selectively reducing the sulphur content of cracked distillates without undesirably affecting the unsaturated olefinic constituents. Sufficiently strong sulphuric acid treatments for reducing sulphur content cause large polymerization losses among the mono-olefins as well as among the di- and tri-olefins so that too much anti-knock material is lost.

The present invention makes possible the selective and controllable reduction in sulphur content of cracked distillates by an effective and economical process which will be described in detail in the following specification.

In one specific embodiment the invention comprises treatment of hydrocarbon oils, particularly cracked hydrocarbon oils in heated vaporous condition and under superatmospheric pressures, with hydrogen in the presence of selected catalysts comprising metal oxides and aluminates.

As a particular feature of the process it is necessary to add hydrogen to the system only in the beginning of the process, the hydrogen produced being in excess of that required, so that it may be recycled and used as made and needed.

The particular feature of the invention is that under the preferred conditions of operation in respect to temperature, pressure, hydrogen concentration and type of catalyst, there is an increase in the hydrogen rather than a consumption, which indicates that any hydrogen sulphide initially formed by the action of hydrogen upon sulphur compounds in the presence of the preferred catalyst is simply an intermediate product which reacts with the catalytic mass to form sulphides of the metals therein contained and liberate the hydrogen. In this sense the hydrogen functions as an effective vehicle for the transfer of sulphur from the oil to the catalyst.

The oxides which may be employed in conjunction with aluminates as promoters in the reactions of hydrogenation comprised within the scope of the invention are those of the metals of the iron group, to-wit: iron, cobalt and nickel, and the oxides of certain metals from the second, third and fourth groups of the periodic classification of the elements. For example, zinc and cadmium from the second group, aluminum from the third group and cerium and thorium from the fourth group, may be used in the form of their oxides as base material in the catalytic mixtures. Other metals from the groups mentioned may be used insofar as they possess the proper degree of catalytic activity and insofar as their cost permits. While the oxides of these various specified metals may be used alternatively in the composite catalyst mixtures the exact effects produced by their use will not be identical.

As aluminates to be used as promoter catalysts in the mixtures those of the alkali and alkaline earth metals may be employed and also the aluminate of zinc. Aluminates may be generally considered to be salts of metaluminic acid ($HAlO_2$), salts of this acid with the following bases having been identified as distinct compounds: Sodium, potassium, lithium, ammonium, barium, calcium, strontium, beryllium, magnesium, zinc, thallium, manganese, iron, cobalt. As a general rule the aluminates of the alkali metals are water soluble and the metallic contact masses characteristic of the invention may be produced by adding single oxides or mixtures of oxides to such solutions, as will be described in the succeeding paragraph. The aluminates of the other bases named are generally relatively infusible solids and made by dry methods consisting generally in heating the proper oxides with aluminum oxide in suitable portions. The number of combinations of oxides and aluminates is quite large and, while the various combinations may be used alternatively, each will exert its own peculiar influence upon the reactions of desulphurization so that they are not exact equivalents.

The general procedure in the preparation of such catalysts is as follows: the oxides or hydroxides of the metal or metals to be used are precipitated from solution by means of suitable reagents such, for example, as the carbonates and hydroxides of the alkali metals. The precipitates are suitably washed to remove adhering reagents and then heated at a suitable temperature for producing the oxides. The mixture of oxides is then added to the solution of an alkali metal aluminate, the solvent evaporated and the mixture of oxides and aluminates dried at temperatures of approximately 200–220° C., preferably not above the last named temperature.

While the foregoing has been given as a general procedure it will be recognized by those familiar with catalyst preparation that the steps of the procedure may be modified to suit particular cases. For example, the oxides and aluminates may be prepared separately and mixed in the relatively dry state prior to final heat treatment.

In utilizing catalysts of the present type in the treatment of hydrocarbon oils in vapor phase, they may be employed alone or in admixture with or deposited upon relatively inert siliceous spacing materials or carriers, such as adsorbent earths, crushed firebrick, silica fragments, etc., the masses being placed in vertical cylindrical treating towers or deposited therein upon regularly spaced trays or pans over which a mixture of hydrocarbon oil vapors and hydrogen is passed.

We have determined that with the type of catalysts specified when using temperatures of approximately 400 to 800° F., and hydrogen pressures of from about 150 to 450 pounds per square inch, that unusual and unexpected results are obtained in desulphurizing the vapors of cracked distillates. Under these conditions (the exact ranges of temperatures, pressure, etc., varying with the particular stock undergoing treatment) desulphurization is effected without consumption of hydrogen but rather with a definite production of hydrogen. Apparently the hydrogen functions as a "transfer agent," which means that it forms hydrogen sulphide initially by reaction with sulphur in the oil vapors, this hydrogen sulphide then reacting with the catalyst masses to form metal sulphides until their sulphur-absorbing capacity is saturated. The presence of hydrogen is necessary to effective desulphurization, as less effective desulphurizing results when merely employing the desulphurizing catalysts without hydrogen pressure. The absence of hydrogen sulphide in the exhaust gases from processes of the present character indicates a reaction mechanism of the type suggested.

The use of a considerable excess of hydrogen at the outset of the process obviates the necessity for developing a hydrogen atmosphere by the pyrolysis of the oil undergoing treatment, so that equilibrium conditions are quickly established and at the same time excessive decomposition of the oil is prevented, the desulphurization proceeding as a selective reaction.

The catalyst mass for desulphurizing the vapors of sulphur-containing cracked distillates may act only for a limited period corresponding to a certain percent transformation of the metallic oxides to sulphides. At such times as the catalytic masses become sulphurized, the process may be stopped or the vapors diverted into chambers containing fresh catalyst while the spent materials are subjected to regenerating steps by any convenient process. Such processes may involve oxidation to produce mixtures of oxides and sulphides which may then be further reduced with hydrogen or reducing gases. The specific method of regenerating the catalyst masses is not a feature of the present process.

In support of the value of the present process the following numerical data is submitted which shows the results obtained in desulphurizing a cracked California gasoline having an initial sulphur content of 0.45%. In Table I following, the catalyst used consisted of 70% nickel oxide (NiO), 25% aluminum oxide ($Al_2O_3$) and 5% sodium aluminate ($NaAlO_2$). This particular catalyst mixture was prepared by concurrent precipitation of the oxides from an aluminate solution.

TABLE I

*Desulphurization of cracked California gasoline*

| Run No. | Time on test | Hydrogen input | $H_2$ recovered | Excess $H_2$ recovered over $H_2$ input | | Pressure | Max. temp. | | Sulphur reduction |
| --- | --- | --- | --- | --- | --- | --- | --- | --- | --- |
| | *Hrs.* | *Cu. ft.* | *Cu. ft.* | *Cu. ft.* | *%* | *# Sq. in.* | *° F.* | *° C.* | *%* |
| Run 140 | 3.42 | 1.47 | 2.87 | 1.4 | 96 | 225 | 665 | 351 | 73.3 |
| 143 | 16.08 | 5.87 | 7.67 | 1.8 | 30.1 | 95 | 617 | 325 | 63.8 |
| 146 | 15.25 | 7.02 | 11.52 | 4.5 | 69.7 | 225 | 610 | 321 | 46.8 |
| 151 | 14.58 | 5.25 | 9.37 | 4.12 | 79 | 225 | 662 | 350 | 30.8 |
| Total | 49.33 | | | | | | | | |

Commenting on the preceding table, it will be observed that there is a considerable though somewhat variable excess of hydrogen recovered in the exhaust gases from the treatment. The runs are consecutive and represent periods of time corresponding to operations on different days. In Run 143 the per cent excess of hydrogen, to-wit: 30.1%, is low on account of the lower pressure of 95 pounds in contrast to the pressure of 225 pounds used in the other periods. As the percentage of sulphur reduction is followed, it will be seen that it decreases as the time on test increases owing to saturation of the catalyst mass with sulphur. At the same time hydrogen excess remains constant on an average though there may be a slightly larger amount recovered in the primary stages of the run.

Table No. 2 shows another set of results obtained in using a catalyst mixture comprising 75% of nickel oxide (NiO), 20% aluminum oxide (Al₂O₃) and 5% of sodium aluminate (NaAlO₂).

TABLE II

*Desulphurization of cracked California gasoline*

| Run No. | Time on test | Hydrogen input | H₂ recovered | Excess H₂ recovered over H₂ input | | Pressure | Max. temp. | | Sulphur reduction |
| --- | --- | --- | --- | --- | --- | --- | --- | --- | --- |
| | Hrs. | Cu. ft. | Cu. ft. | Cu. ft. | % | # sq. in. | ° F. | ° C. | % |
| 73 | 3.00 | 1.2 | 1.57 | 0.37 | 27.9 | 225 | 665 | 351 | 59.6 |
| 74 | 16.58 | 5.87 | 8.95 | 3.08 | 52.7 | 225 | 660 | 349 | 54.3 |
| 75 | 8.42 | 2.71 | 4.43 | 0.72 | 62.3 | 225 | 660 | 349 | 49.0 |
| 78 | 14.58 | 4.82 | 6.45 | 1.53 | 33.8 | 95 | 617 | 325 | 61.7 |
| 83 | 16.08 | 6.43 | 7.31 | 0.88 | 13.7 | 225 | 617 | 325 | 83.0 |
| 85 | 15.00 | 8.56 | 7.30 | −1.16 | −14.5 | 225 | 617 | 325 | 66.0 |
| 86 | 16.33 | 6.44 | 6.90 | 0.41 | 6.1 | 225 | 617 | 325 | 66.0 |
| 87 | 17.83 | 6.06 | 10.25 | 4.19 | 69.7 | 225 | 617 | 325 | 56.3 |
| 93 | | 4.58 | 8.7 | 4.12 | 89.2 | 450 | 617 | 325 | 53.2 |
| 94 | | 0.42 | 7.26 | 6.84 | 1610. | 450 | 617 | 325 | 28.7 |
| Total | 107.82 | | | | | | | | |

It will be noted in examining the percentage excess of hydrogen that there is some variation, but this may be attributed to variations in the physical state of the catalyst. The overall result indicates again that up to a point approaching complete sulphurization of the catalyst mass that hydrogen is evolved from the zone of the reaction rather than consumed. The average percent sulphur reduction is fairly constant up to this same point, though it drops off sharply as saturation of the catalyst mass is reached.

The fixed gas produced in conducting treatments of the character comprised within the scope of the invention may consist of as high as 95% hydrogen and may contain, in addition, small amounts of low boiling paraffin hydrocarbons such as methane. Owing to the absence of hydrogen sulphide, this gas may be recirculated until such a time as the hydrogen content becomes too low on account of the gradual accumulation of paraffin hydrocarbons.

The foregoing specification describing the nature of the invention and the numerical data advanced in support of its value are sufficient for their respective purposes but neither is to be construed as imposing under limitations upon the generally broad scope of the invention.

I claim as my invention:

1. In the desulphurization of hydrocarbon oils by treatment with hydrogen, the improvement which comprises reacting the hydrogen with sulphur compounds contained in the oil in the presence of a metal oxide and an aluminate, the treatment being carried out at a temperature between 400° F. and 800° F. and under a hydrogen pressure of from 150 to 450 pounds per square inch.

2. In the desulphurization of hydrocarbon oils by treatment with hydrogen, the improvement which comprises reacting the hydrogen with sulphur compounds contained in the oil in the presence of an aluminate and an oxide of a metal of the iron group of the periodic system, the treatment being carried out at a temperature between 400° F. and 800° F. and under a hydrogen pressure of from 150 to 450 pounds per square inch.

3. In the desulphurization of hydrocarbon oils by treatment with hydrogen, the improvement which comprises reacting the hydrogen with sulphur compounds contained in the oil in the presence of an aluminate and an oxide of a metal of the second group of the periodic system, the treatment being carried out at a temperature between 400° F. and 800° F. and under a hydrogen pressure of from 150 to 450 pounds per square inch.

4. In the desulphurization of hydrocarbon oils by treatment with hydrogen, the improvement which comprises reacting the hydrogen with sulphur compounds contained in the oil in the presence of an aluminate and an oxide of a metal of the third group of the peridic system, the treatment being carried out at a temperature between 400° F. and 800° F. and under a hydrogen pressure of from 150 to 450 pounds per square inch.

VLADIMIR IPATIEFF.